US010003659B2

United States Patent
Suryavanshi et al.

(10) Patent No.: US 10,003,659 B2
(45) Date of Patent: Jun. 19, 2018

(54) EFFICIENT GROUP COMMUNICATIONS LEVERAGING LTE-D DISCOVERY FOR APPLICATION LAYER CONTEXTUAL COMMUNICATION

(71) Applicant: QUALCOMM Incorporated, San Diego, CA (US)

(72) Inventors: Vijay Anandrao Suryavanshi, San Diego, CA (US); Kirankumar Bhoja Anchan, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 14/529,312

(22) Filed: Oct. 31, 2014

(65) Prior Publication Data

US 2016/0127479 A1 May 5, 2016

(51) Int. Cl.
*H04L 29/08* (2006.01)

(52) U.S. Cl.
CPC .......... *H04L 67/16* (2013.01); *H04L 67/104* (2013.01); *H04L 67/1091* (2013.01)

(58) Field of Classification Search
CPC ....................................................... H04L 67/16
USPC ......................................................... 709/219
See application file for complete search history.

(56) References Cited

U.S. PATENT DOCUMENTS

| | | | | |
|---|---|---|---|---|
| 7,716,664 B2 * | 5/2010 | Hughes | ...................... | G06F 8/61 707/821 |
| 8,594,632 B1 * | 11/2013 | Azizi | ..................... | H04W 12/06 455/411 |
| 8,798,617 B1 * | 8/2014 | Cole | ...................... | H04W 8/005 455/404.2 |
| 8,909,664 B2 * | 12/2014 | Hopkins | ........... | G06F 17/30209 707/763 |
| 9,075,883 B2 * | 7/2015 | Verkasalo | ......... | G06F 17/30867 |
| 9,288,829 B2 * | 3/2016 | Park | .................... | H04W 76/023 |
| 9,426,624 B2 * | 8/2016 | Stephens | ............... | H04W 4/025 |
| 9,519,699 B1 * | 12/2016 | Kulkarni | ........... | G06F 17/30545 |
| 9,532,224 B2 * | 12/2016 | Baek | ..................... | H04W 12/08 |

(Continued)

FOREIGN PATENT DOCUMENTS

| | | | | |
|---|---|---|---|---|
| WO | | 2004040918 A2 | 5/2004 | |
| WO | WO | 2004040918 A2 * | 5/2004 | ............ H04W 8/005 |

OTHER PUBLICATIONS

Alam et al., "Secure Device-to-Device Communicaiton in LTE-A", Apr. 2014.*

(Continued)

*Primary Examiner* — Ondrej Vostal
(74) *Attorney, Agent, or Firm* — Jae-Hee Choi; Muncy, Geissler, Olds & Lowe, P.C.

(57) ABSTRACT

The disclosure relates to leveraging peer-to-peer (P2P) discovery messages for application layer contextual communication. A P2P middleware layer of a user device receives a P2P discovery message, the P2P discovery message comprising metadata including an identifier of a first application and content to be rendered by the first application, determines whether or not there is an application installed on the user device that can render the content, and sends the content to be rendered by the first application to the installed application based on there being an application installed on the user device that can render the content.

27 Claims, 14 Drawing Sheets

(56) References Cited

U.S. PATENT DOCUMENTS

| | | | |
|---|---|---|---|
| 2002/0156875 A1* | 10/2002 | Pabla | H04L 1/24 709/220 |
| 2003/0028528 A1* | 2/2003 | Christensen | G06F 17/3089 |
| 2004/0003039 A1* | 1/2004 | Humphrey | A63F 13/12 709/204 |
| 2004/0064512 A1* | 4/2004 | Arora | H04L 51/04 709/206 |
| 2004/0088348 A1* | 5/2004 | Yeager | H04L 67/104 709/202 |
| 2004/0220926 A1* | 11/2004 | Lamkin | G06F 17/30017 |
| 2005/0004949 A1* | 1/2005 | Trepess | G06F 17/3089 |
| 2005/0058108 A1* | 3/2005 | Ekberg | H04W 48/14 370/338 |
| 2005/0058109 A1* | 3/2005 | Ekberg | H04L 29/12113 370/338 |
| 2005/0135286 A1* | 6/2005 | Nurminen | H04W 84/18 370/310 |
| 2006/0010204 A1* | 1/2006 | Jalava | G06Q 10/10 709/205 |
| 2007/0214279 A1* | 9/2007 | Choi | H04L 65/4084 709/231 |
| 2007/0280257 A1* | 12/2007 | Vare | H04H 20/57 370/395.3 |
| 2007/0282889 A1* | 12/2007 | Ruan | G06F 8/24 |
| 2007/0299820 A1* | 12/2007 | Bushmitch | G06F 17/30997 |
| 2008/0133650 A1* | 6/2008 | Saarimaki | G06F 8/65 709/203 |
| 2009/0037431 A1* | 2/2009 | Martino | G06Q 30/02 |
| 2009/0172082 A1* | 7/2009 | Sufuentes | G06F 21/128 709/203 |
| 2009/0222517 A1* | 9/2009 | Kalofonos | G06Q 10/10 709/204 |
| 2010/0145912 A1* | 6/2010 | Li | H04L 67/104 707/622 |
| 2010/0261424 A1* | 10/2010 | Mittal | H04H 60/63 455/3.01 |
| 2011/0137986 A1* | 6/2011 | Wolf | G06F 17/3089 709/204 |
| 2011/0216753 A1* | 9/2011 | Kneckt | H04L 45/70 370/338 |
| 2011/0314145 A1* | 12/2011 | Raleigh | H04L 41/0893 709/224 |
| 2012/0117201 A1* | 5/2012 | Arolovitch | G06F 17/30902 709/219 |
| 2012/0167184 A1* | 6/2012 | Vanderveen | H04L 29/12028 726/5 |
| 2012/0258664 A1* | 10/2012 | Kinneberg | H04W 8/005 455/41.2 |
| 2013/0145165 A1* | 6/2013 | Brown | H04L 9/3247 713/176 |
| 2013/0297422 A1 | 11/2013 | Hunter et al. | |
| 2014/0003373 A1* | 1/2014 | Hakola | H04W 48/16 370/329 |
| 2014/0036793 A1* | 2/2014 | Johnsson | H04W 24/04 370/329 |
| 2014/0051392 A1* | 2/2014 | Isomaki | H04W 4/20 455/411 |
| 2014/0153538 A1 | 6/2014 | Kuo | |
| 2014/0162544 A1 | 6/2014 | Edge | |
| 2014/0162601 A1* | 6/2014 | Kim | H04W 12/06 455/411 |
| 2014/0269436 A1* | 9/2014 | Khanna | G06Q 20/127 370/259 |
| 2014/0348061 A1* | 11/2014 | Salkintzis | H04W 4/008 370/328 |
| 2014/0351832 A1* | 11/2014 | Cho | H04L 67/141 719/328 |
| 2014/0359598 A1* | 12/2014 | Oliver | G06F 8/61 717/174 |
| 2014/0372216 A1* | 12/2014 | Nath | G06Q 30/0251 705/14.54 |
| 2015/0046570 A1* | 2/2015 | Misra | H04L 67/20 709/219 |
| 2015/0052221 A1* | 2/2015 | Yoon | H04W 4/008 709/217 |
| 2015/0172189 A1* | 6/2015 | Pitchai | H04L 45/745 370/392 |
| 2015/0262127 A1* | 9/2015 | Ziegler | G06Q 10/10 705/342 |
| 2015/0359904 A1* | 12/2015 | Widdison | A61K 47/48384 424/181.1 |
| 2016/0006800 A1* | 1/2016 | Summers | G06F 9/5055 709/203 |
| 2016/0050621 A1* | 2/2016 | Enomoto | H04W 4/00 370/311 |
| 2016/0050702 A1* | 2/2016 | Sorrentino | H04W 56/0025 370/329 |
| 2016/0050703 A1* | 2/2016 | Johnsson | H04W 8/005 370/329 |
| 2016/0065362 A1* | 3/2016 | Choyi | H04L 63/065 380/279 |
| 2016/0094943 A1* | 3/2016 | Cao | H04L 67/06 455/456.1 |
| 2016/0269185 A1* | 9/2016 | Stojanovski | H04L 9/3247 |
| 2016/0381630 A1* | 12/2016 | Krishnamoorthy | H04W 48/20 370/329 |

OTHER PUBLICATIONS

Seung-Hoon et al., "Samsung—ETRI Merged MAC Proposal to TG8 CFC", May 2014.*
Mumtaz et al., "Introduction to D2D Communication", 2014.*
Barkai, "An Introduction of Peer-to-Peer Computing", 2000.*
Singh et al., "A Survey of P2P Middlewares", 2005.*
Aiken et al., "Network Policy and Services: A Report of a Workshop on Middleware", RFC2768, 2000.*
Wikipedia, "Middleware", 2017.*
Ghose et al., "An Empirical Analysis of Sponsored Search Performance in Search Engine Advertising", 2008.*
International Search Report and Written Opinion—PCT/US2015/054837—ISA/EPO—dated Jan. 4, 2016.
Park S-H., et al., "Samsung-ETRI Merged MAC Proposal to TG8 CFC, 15-14-0254-00-0008-Samsung-Etri-Merged-Mac-Proposal-to-Tg8-Cfc", IEEE Draft, 15-14-0254-00-0008-Samsung-Etri-Merged-Mac-Proposal-To-Tg8-Cfc, IEEE-SA Mentor, Piscataway, NJ USA, vol. 802.15.8, May 5, 2014 (May 5, 2014), pp. 1-45, XP068069804, [retrieved on May 5, 2014] slides 3, 11, 12, 14-16.
Huawei: "Future Smartphone Solution White Paper," 2012, pp. 1-28.
Tsai Y.H., et al., "Proximity-based Service Beyond 4G Network: Peer-aware Discovery and Communication Using E-UTRAN and WLAN," 12th IEEE International Conference on Trust, Security and Privacy in Computing and Communications, 2013, pp. 1345-1350.

* cited by examiner

EFFICIENT GROUP COMMUNICATIONS LEVERAGING LTE-D DISCOVERY FOR APPLICATION LAYER CONTEXTUAL COMMUNICATION

BACKGROUND

1. Field of the Disclosure

The disclosure is related to efficient group communications leveraging Long-Term Evolution-Direct (LTE-D) discovery for application layer contextual communication.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

More recently, LTE has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). It does so continuously in a synchronous system that is battery efficient and can concurrently detect thousands of services in proximity.

LTE-D operates on licensed spectrum as a service to mobile applications. LTE-D is a D2D solution that enables service layer discovery. Mobile applications on LTE-D devices can instruct LTE-D to monitor for mobile application services on other devices and announce their own services (for detection by services on other LTE-D devices) at the physical layer. This allows the applications to be closed while LTE-D does the work—continuously—and to notify the client application when it detects a match to the monitored set.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevant matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below The disclosure is related to leveraging peer-to-peer (P2P) discovery messages for application layer contextual communication. A method for leveraging P2P discovery messages for application layer contextual communication includes receiving, at a P2P middleware layer of a user device, a P2P discovery message, the P2P discovery message comprising metadata including an identifier of a first application and content to be rendered by the first application, determining, by the P2P middleware layer, whether or not there is an application installed on the user device that can render the content, and based on there being an application installed on the user device that can render the content, sending, by the P2P middleware layer, the content to be rendered by the first application to the installed application.

An apparatus for leveraging P2P discovery messages for application layer contextual communication includes a processor and a P2P middleware layer of a user device configured to perform, in conjunction with the processor, operations comprising: receiving a P2P discovery message, the P2P discovery message comprising metadata including an identifier of a first application and content to be rendered by the first application, determining whether or not there is an application installed on the user device that can render the content, and sending the content to be rendered by the first application to the installed application based on there being an application installed on the user device that can render the content.

An apparatus for leveraging P2P discovery messages for application layer contextual communication includes means for receiving, at a P2P middleware layer of a user device, a P2P discovery message, the P2P discovery message comprising metadata including an identifier of a first application and content to be rendered by the first application, means for determining, by the P2P middleware layer, whether or not there is an application installed on the user device that can render the content, and means for sending, by the P2P middleware layer, the content to be rendered by the first application to the installed application based on there being an application installed on the user device that can render the content.

An apparatus for leveraging P2P discovery messages for application layer contextual communication includes logic configured to receive, at a P2P middleware layer of a user device, a P2P discovery message, the P2P discovery message comprising metadata including an identifier of a first application and content to be rendered by the first application, logic configured to determine, by the P2P middleware layer, whether or not there is an application installed on the user device that can render the content, and logic configured to send, by the P2P middleware layer, the content to be rendered by the first application to the installed application based on there being an application installed on the user device that can render the content.

A non-transitory computer-readable medium for leveraging P2P discovery messages for application layer contextual communication includes at least one instruction to receive, at a P2P middleware layer of a user device, a P2P discovery message, the P2P discovery message comprising metadata including an identifier of a first application and content to be rendered by the first application, at least one instruction to determine, by the P2P middleware layer, whether or not there is an application installed on the user device that can render the content, and at least one instruction to send, by the P2P middleware layer, the content to be rendered by the first application to the installed application based on there being an application installed on the user device that can render the content.

Other objects and advantages associated with the aspects and/or embodiments disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
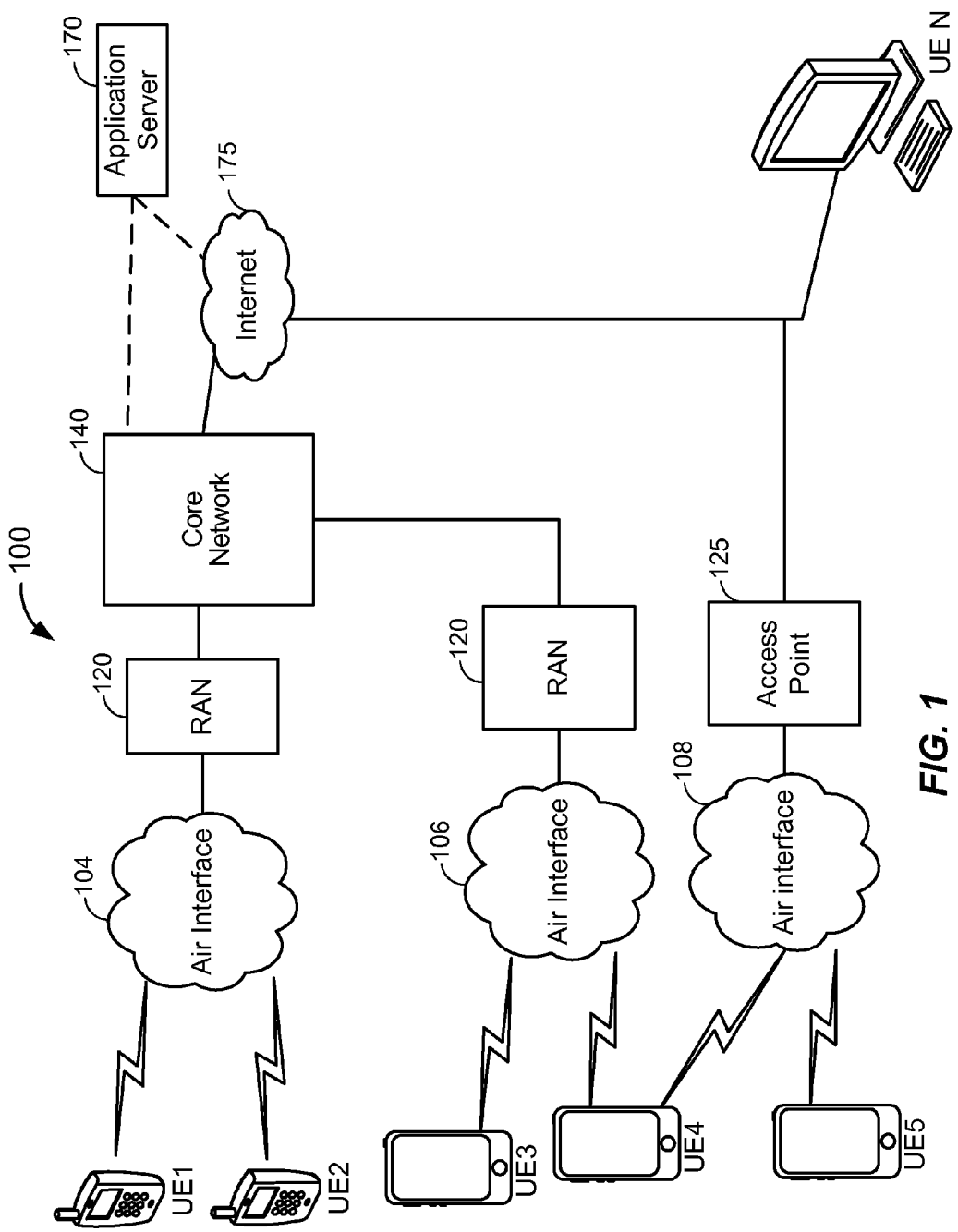
FIG. 1 illustrates a high-level system architecture of a wireless communications system in accordance with an aspect of the disclosure.

The disclosure relates to leveraging peer-to-peer (P2P) discovery messages for application layer contextual communication. A P2P middleware layer of a user device receives a P2P discovery message, the P2P discovery message comprising metadata including an identifier of a first application and content to be rendered by the first application, determines whether or not there is an application installed on the user device that can render the content, and sends the content to be rendered by the first application to the installed application based on there being an application installed on the user device that can render the content.

Further aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175, and/or to provide content (e.g., web page downloads) to the UEs.

Figure 2:
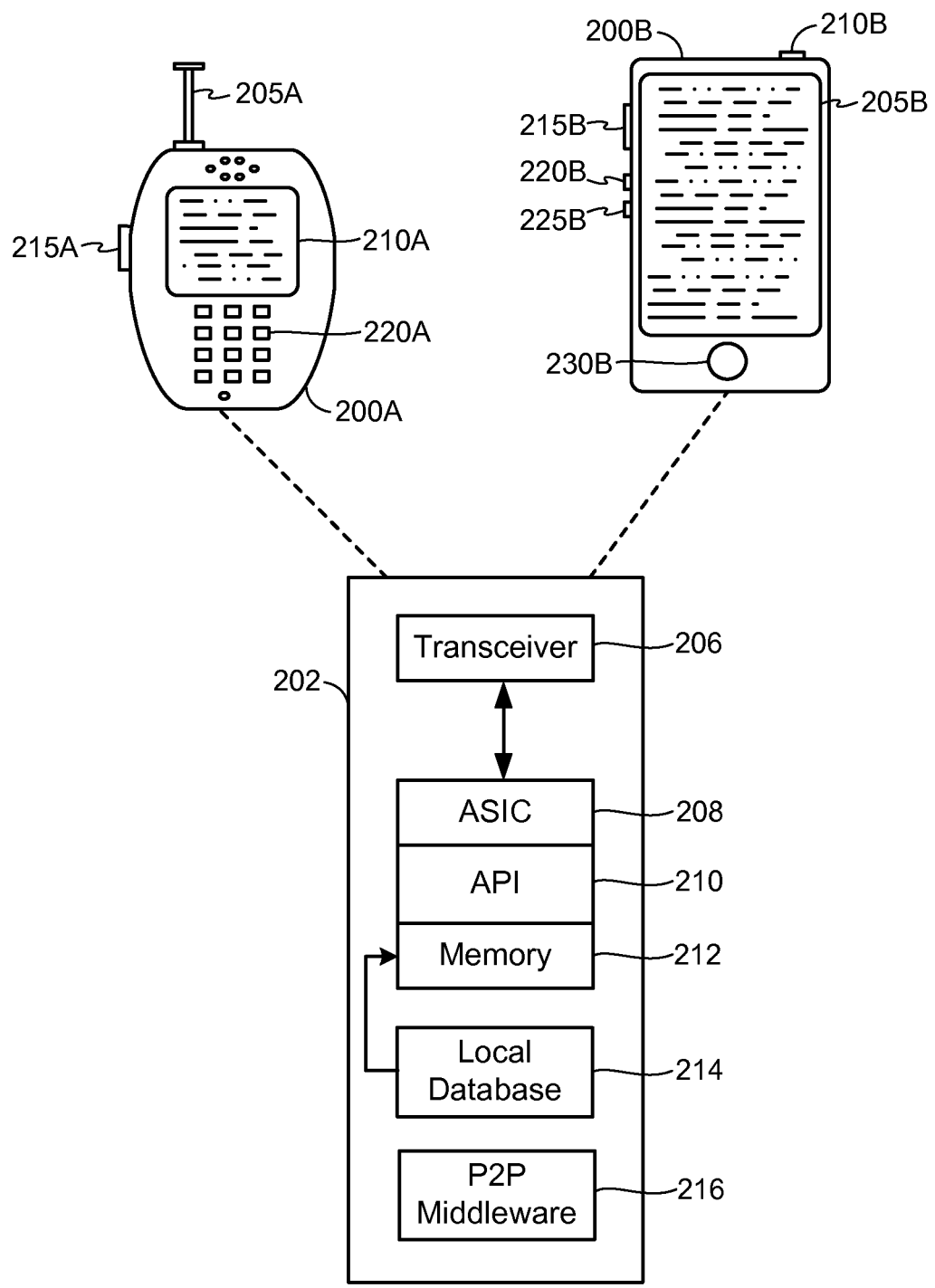
FIG. 2 illustrates examples of user equipments (UEs) in accordance with an aspect of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like. The platform 202 also includes a P2P middleware layer 216 that can perform operations in conjunction with the ASIC 208, as described further herein.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

For example, where the UE 200A/200B is configured to leverage P2P discovery messages for application layer contextual communication, as described herein, the P2P middleware layer 216, in conjunction with the ASIC 208, may be configured to perform the operations for leveraging the P2P discovery messages for application layer contextual communication. The operations may include receiving a P2P discovery message that comprises metadata including an identifier of a first application and content to be rendered by the first application, determining whether or not there is an application installed on the UE 200A/200B that can render the content, and sending the content to be rendered by the first application to the installed application based on there being an application installed on the UE 200A/200B that can render the content.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
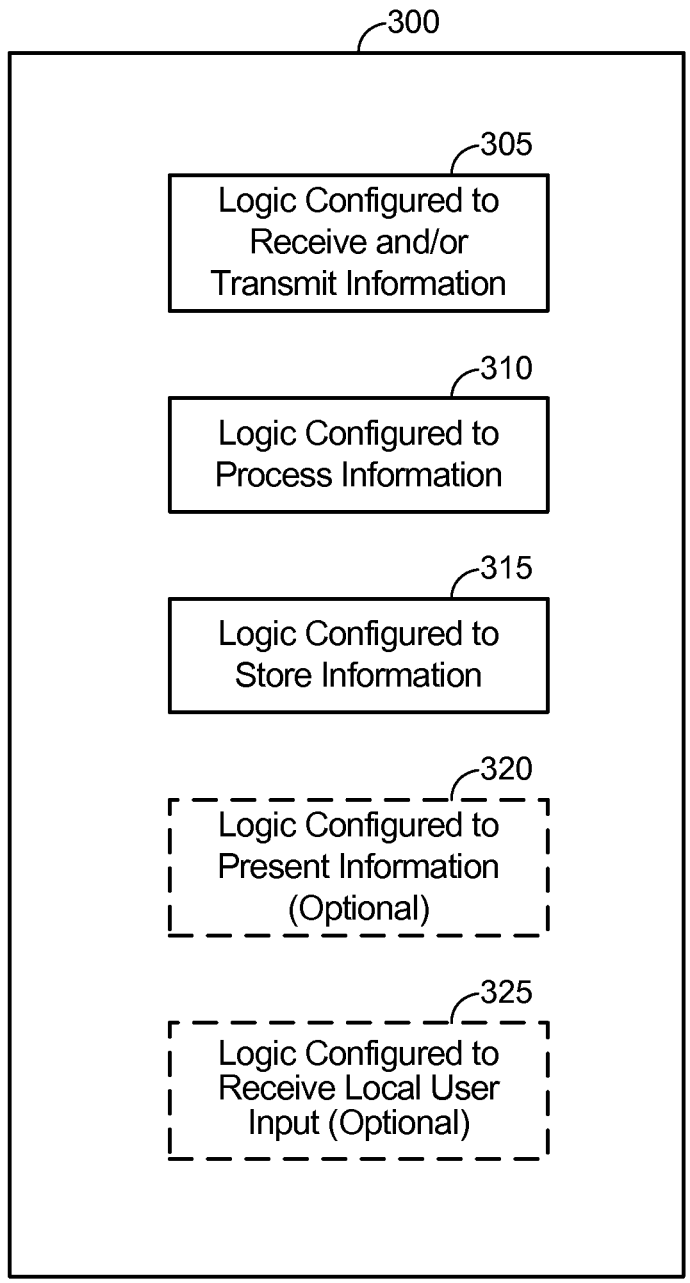
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., application server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

For example, where the communication device 300 is configured to leverage P2P discovery messages for application layer contextual communication, as described herein, the logic configured to process information 310 may be configured to perform the operations for leveraging the P2P discovery messages for application layer contextual communication. In that case, the logic configured to process information 310 may include a P2P middleware layer, as described herein, in addition to the processor described above. In such a case, the logic configured to process information 310 may be configured to receive, at the P2P middleware layer, a P2P discovery message, the P2P discovery message comprising metadata including an identifier of a first application and content to be rendered by the first application, to determine, by the P2P middleware layer, whether or not there is an application installed on the communication device 300 that can render the content, and to send, by the P2P middleware layer, the content to be rendered by the first application to the installed application based on there being an application installed on the communication device 300 that can render the content.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the application server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the application server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
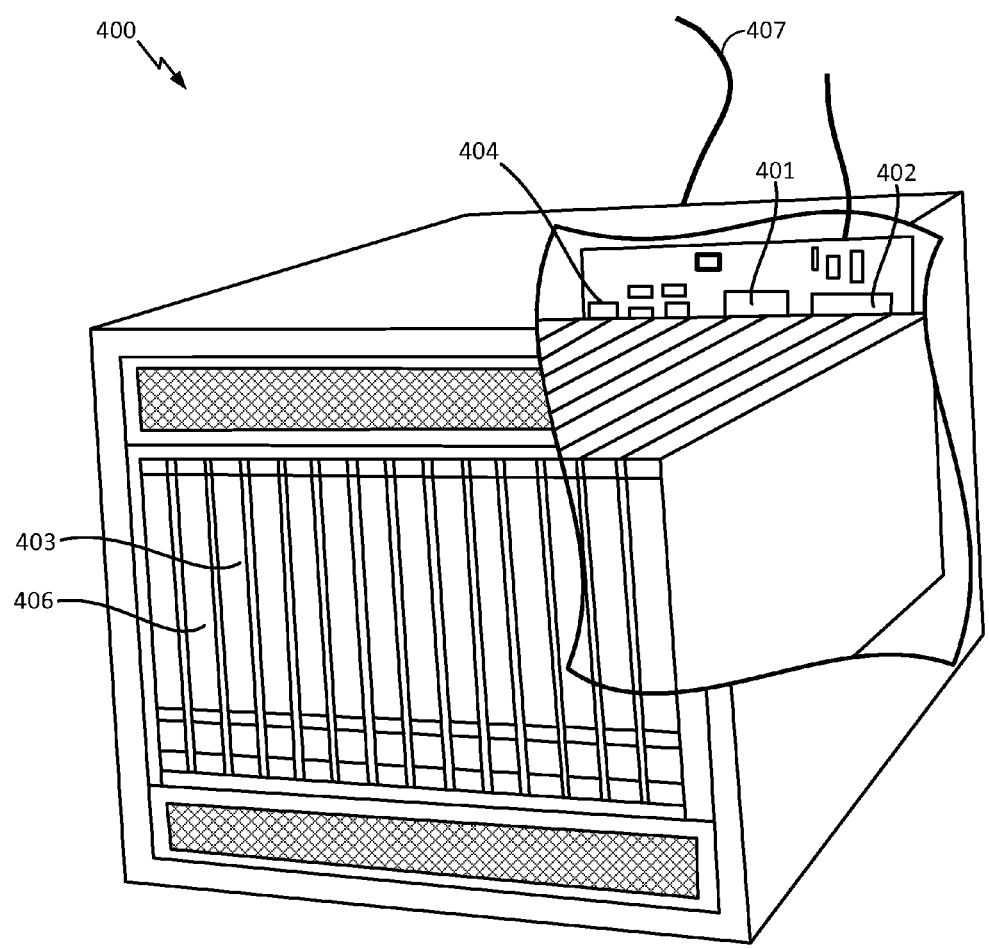
FIG. 4 illustrates a server in accordance with an aspect of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

Figure 5:
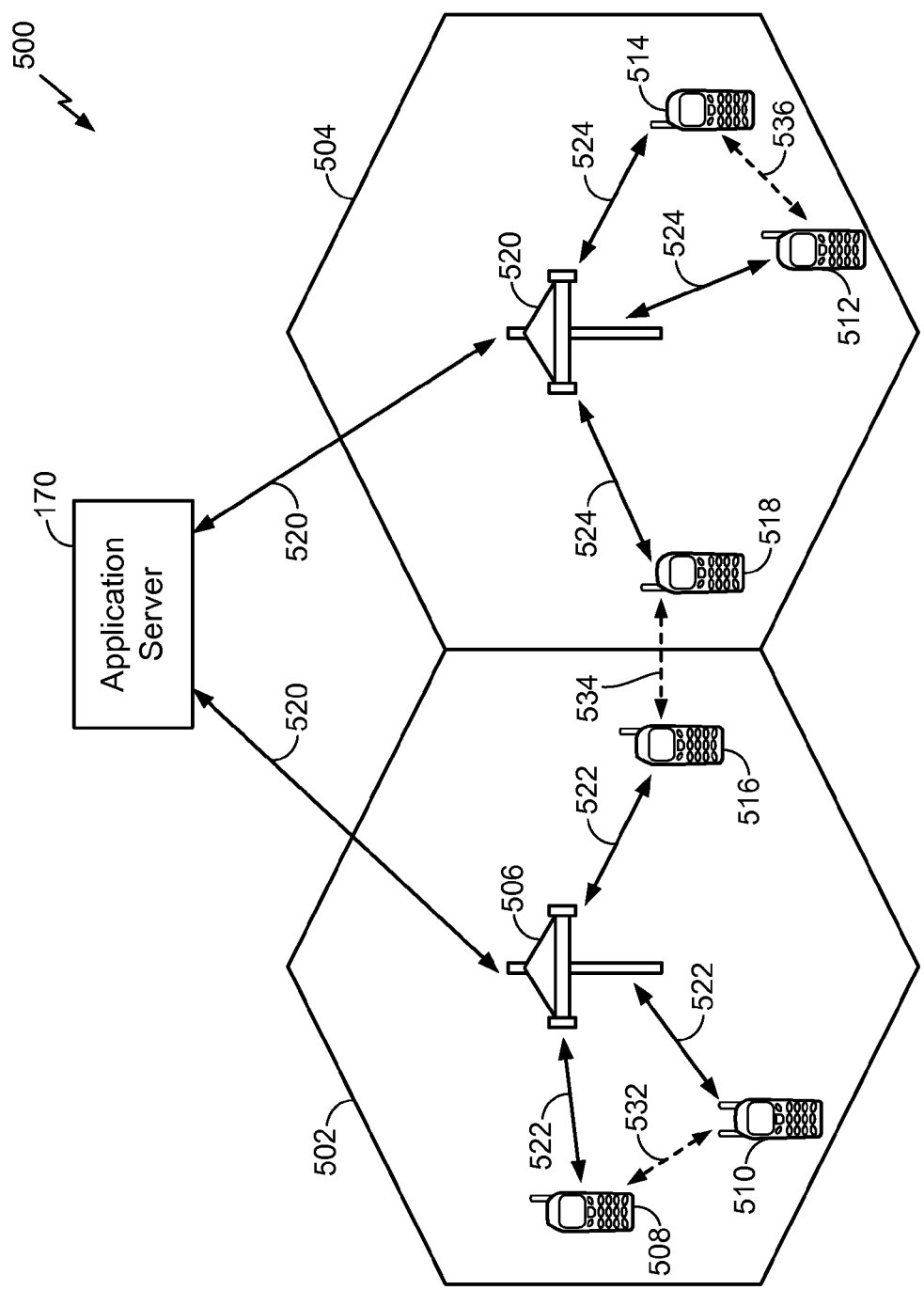
FIG. 5 illustrates a wireless communications system in which UEs can connect directly to other UEs using device-to-device (D2D) peer-to-peer (P2P) technology while also connecting to a Wireless Wide Area Network (WWAN).

FIG. 5 illustrates a wireless communications system 500 in which UEs can connect directly to other UEs using D2D P2P technology (e.g., LTE-D, WiFi Direct, Bluetooth, etc.) while also connecting to a Wireless Wide Area Network (WWAN), such as an LTE network. Referring to FIG. 5, the application server 170 is connected to a first cell 502 having a first base station 506, a second cell 504 having a second base station 520. The application server 170 is coupled to the first base stations 506 and the second base station 520 via a network link 520. The coverage area of a given base station is represented by the cell in which the given base station is located. In the example of FIG. 5, the first cell 502 includes the coverage area corresponding to the first base station 506 and the second cell 504 includes the coverage area corresponding to the second base station 520.

Each of cells 502, 504 in the wireless communications system 500 include various UEs that communicate with the respective base stations 506, 520 and with the application server 170 via the respective base stations 506, 520. For example, in FIG. 5, the first cell 502 includes UE 508, UE 510, and UE 516, while the second cell 504 includes UE 512, UE 514, and UE 518. Each of these UEs may correspond to a UE such as UEs 200A or 200B illustrated in FIG. 2. Although not shown in FIG. 5, in some embodiments the base stations 506, 520 may be connected to one another via a backhaul link.

One or more of UE 508, UE 510, UE 516, UE 512, UE 514, and UE 518 may support direct (or D2D) P2P communications, such as LTE-D communications. Such UEs may support communicating with one another directly without communicating through another device or a network infrastructure element, such as the first base station 506 or the second base station 520, and may also support communications through network infrastructure elements, such as the first base station 506 and/or the second base station 520. In communications that involve network infrastructure, signals may generally be transmitted and received through uplink and downlink connections between the UEs and the base stations 506, 520, such as link 522 in the first cell 502 and link 524 in the second cell 504. Each of the base stations 506, 520 generally serve as the attachment point for the UEs in the corresponding cells 502, 504 and facilitate communications between the UEs served therein. When two or more UEs, such as UE 508 and UE 510, wish to communicate with one another and are located in sufficient proximity to each other, then a direct P2P link (e.g., an LTE-D link) can be established therebetween, which may offload traffic from the base station 506 serving the UEs 508, 510, allow UEs 508, 510 to communicate more efficiently, and provide other advantages that will be apparent to those skilled in the art.

As shown in FIG. 5, UE 512 can communicate with UE 514 through intermediate base station 520 via link 524, and UEs 512, 514 may further communicate via a P2P link 536. Furthermore, for inter-cell communications where the participating UEs are in different nearby cells, a direct P2P communications link is still a possibility, which is illustrated in FIG. 5 where UE 516 and UE 518 may communicate using direct P2P communications illustrated by dashed link 534.

The links 532, 534, and/or 536 illustrated in FIG. 5 may be LTE-D links, for example. LTE-D is a proposed 3GPP (Release 12) D2D solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity.

LTE-D operates on licensed spectrum as a service to mobile applications. LTE-D is a D2D solution that enables service layer discovery. Mobile applications on LTE-D devices can instruct LTE-D to monitor for mobile application services on other devices and announce their own services (for detection by services on other LTE-D devices) at the physical layer. This allows the applications to be closed while LTE-D does the work—continuously—and to notify the client application when it detects a match to the monitored set.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D proposes periodic P2P discovery messages that are transmitted by LTE-D capable devices and received and decoded by LTE-D capable devices. The LTE-D capable devices wakeup periodically and synchronously to discover all devices within range. Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

Note that in some cases, after two or more LTE-D devices, such as UEs 516 and 518 in FIG. 5, discover each other and wish to establish an LTE-D session for communication, the LTE network may be required to authorize establishment of the LTE-D session, referred to herein as network assisted connection setup. If the LTE network authorizes the LTE-D session, the actual media is exchanged via D2D between the LTE-D devices.

The periodic discovery messages transmitted between LTE-D capable devices contain LTE-D "Expressions." LTE-D relies on Expressions for both discovery of proximate peers and facilitating communication between proximate peers. Expressions at the application or service layer are referred to as "Expression Names" (e.g., ShirtS ale @Gap.com, Jane @Facebook.com, etc.). Expression Names at the application layer are mapped to bit-strings at the physical layer that are referred to as "Expression Codes." In an example, each Expression Code can have a length of 128 bits (e.g., "11001111 . . . 1011," etc.). As will be appreciated, any reference to a particular Expression can be used to refer to the Expression's associated Expression Name, Expression Code or both, depending upon the context. Expressions can be either Private or Public. Public Expressions are made public and can be identified by any application, whereby Private Expressions are targeted for specific audiences.

Figure 6:
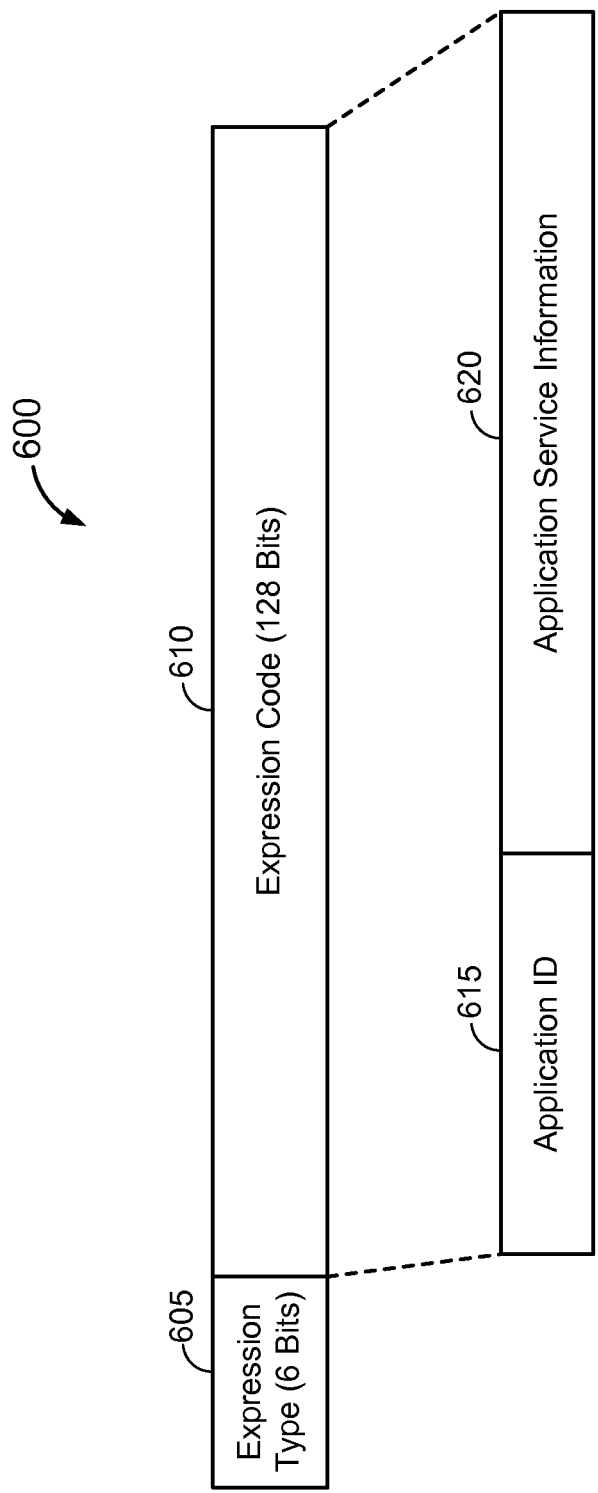
FIG. 6 illustrates an individual P2P discovery message 600 for LTE-D in accordance with an aspect of the disclosure.

FIG. 6 illustrates an individual P2P discovery message 600 for LTE-D in accordance with an aspect of the disclosure. Referring to FIG. 6, the discovery message 600 includes a 6-bit Expression Type Field 605 and a 128-bit Expression Code Field 610. The 128-bit Expression Code Field 610 includes an Application Identifier field 615 for a particular LTE-D aware application and an Application Service Information field 620. LTE-D aware applications/middleware decipher the LTE-D Expression based on the Type and Content of the message. Specifically, the Application Service Information 620 is decodable by the application identified in the Application Identifier field 615 and triggers specific actions for that application.

Figure 7:
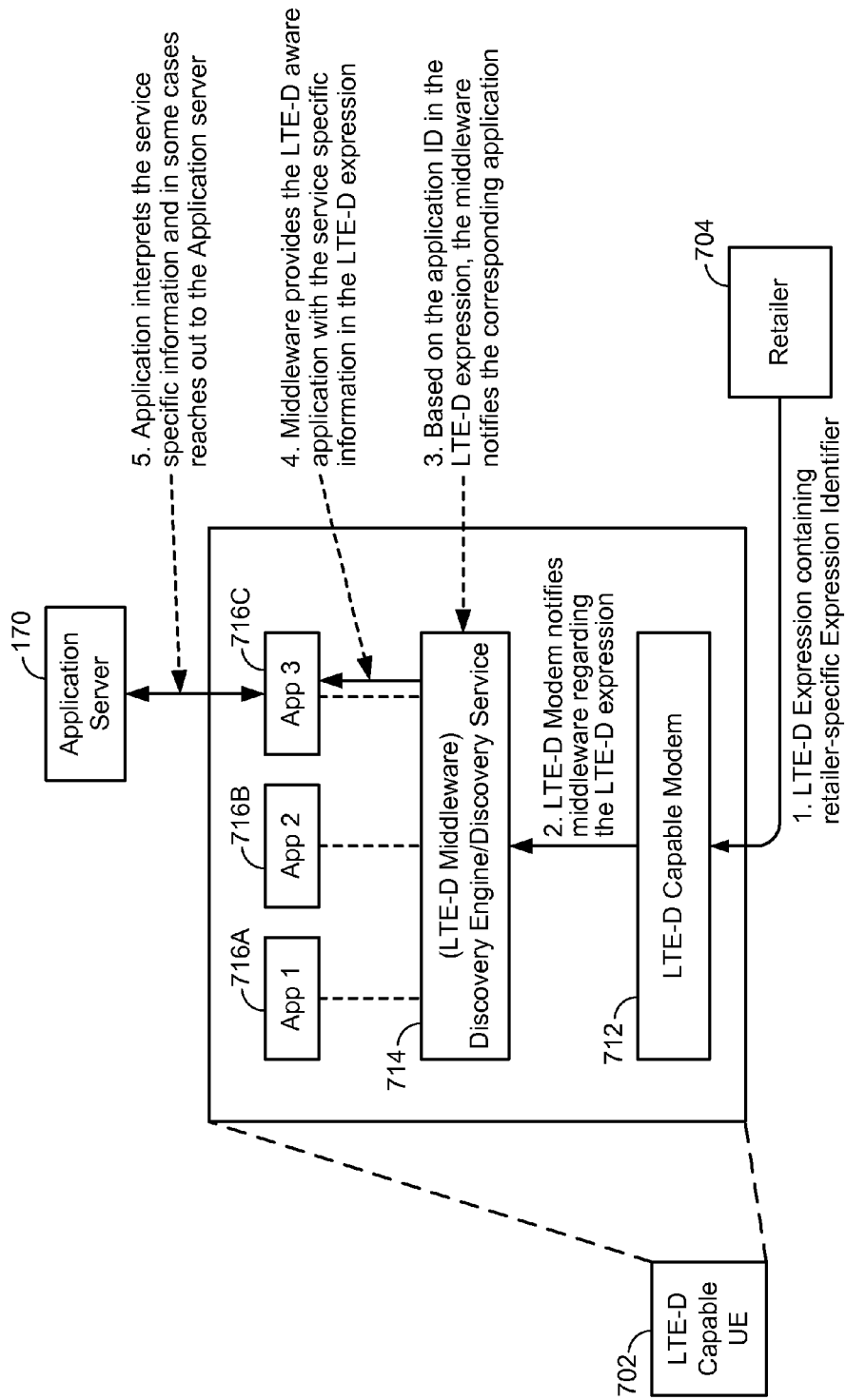
FIG. 7 illustrates an example of a push advertising solution.

LTE-D discovery messages, such as discovery message 600, can be used to push advertising to nearby UEs. FIG. 7 illustrates an example of a push advertising solution. At step 1, an LTE-D capable UE 702, specifically the LTE-D capable modem 712, receives an LTE-D discovery message containing an LTE-D expression from a retailer 704 that includes a retailer-specific expression identifier. At step 2, the LTE-D capable modem 712 notifies the LTE-D middleware 714 regarding the LTE-D expression. At step 3, based on the application identifier in the LTE-D expression, the LTE-D middleware 714 notifies the corresponding LTE-D aware application, here, LTE-D aware application 716C. In the example of FIG. 7, the UE 702 includes three LTE-D aware applications 716A-C. As is apparent, however, UE 702 could have more or less such applications. At step 4, the LTE-D middleware 714 provides the LTE-D aware application 716C with the service specific information in the received LTE-D expression. At step 5, the LTE-D aware application 716C interprets the service specific information, and in some cases reaches out to the application server 170.

Although FIG. 7 illustrates an example of push advertising, the same process applies in the case of pull advertising, where the UE 702 advertises that it has LTE-D aware applications and can receive corresponding advertisements and/or content. In that case, steps 1-5 are the same, except that the UE 702 receives the LTE-D discover message in step 1 because it requested it via an advertising message.

In most cases, the push advertising typically results in displaying a webpage to the end user via a retailer-specific LTE-D aware application. Thus, in the example of FIG. 7, LTE-D aware application 716C would be a retailer-specific LTE-D aware application, and UE 702 would have to have LTE-D aware application 716C installed in order to render the content in the received LTE-D expression.

However, according to an aspect of the disclosure, LTE-D expressions can be enhanced to indicate additional metadata, such as a uniform resource locator (URL), real-time microblog application feed updates among users that are LTE-D proximal, real-time location updates that do not require invoking a location-specific application, etc. The LTE-D middleware can inspect the LTE-D expression and, instead of invoking the specific LTE-D aware application identified in the LTE-D discovery message, can present the user with the information in the LTE-D expression using a different application.

This obviates the need for dedicated LTE-D applications, since the LTE-D middleware handles the LTE-D expression information and can invoke a standard high-level operating system (HLOS) application, such as a web browser, a map application, an image viewer, etc., to present the information, instead of requiring the user to download the LTE-D aware application identified in the LTE-D discovery message.

The LTE-D middleware logic can still determine whether the identified LTE-D aware application is available on the UE. If it is, then the LTE-D middleware can pass the information to that application, otherwise it can process the information locally via a different HLOS application. There is also no need to deploy LTE-D specific application servers.

Figure 8A:
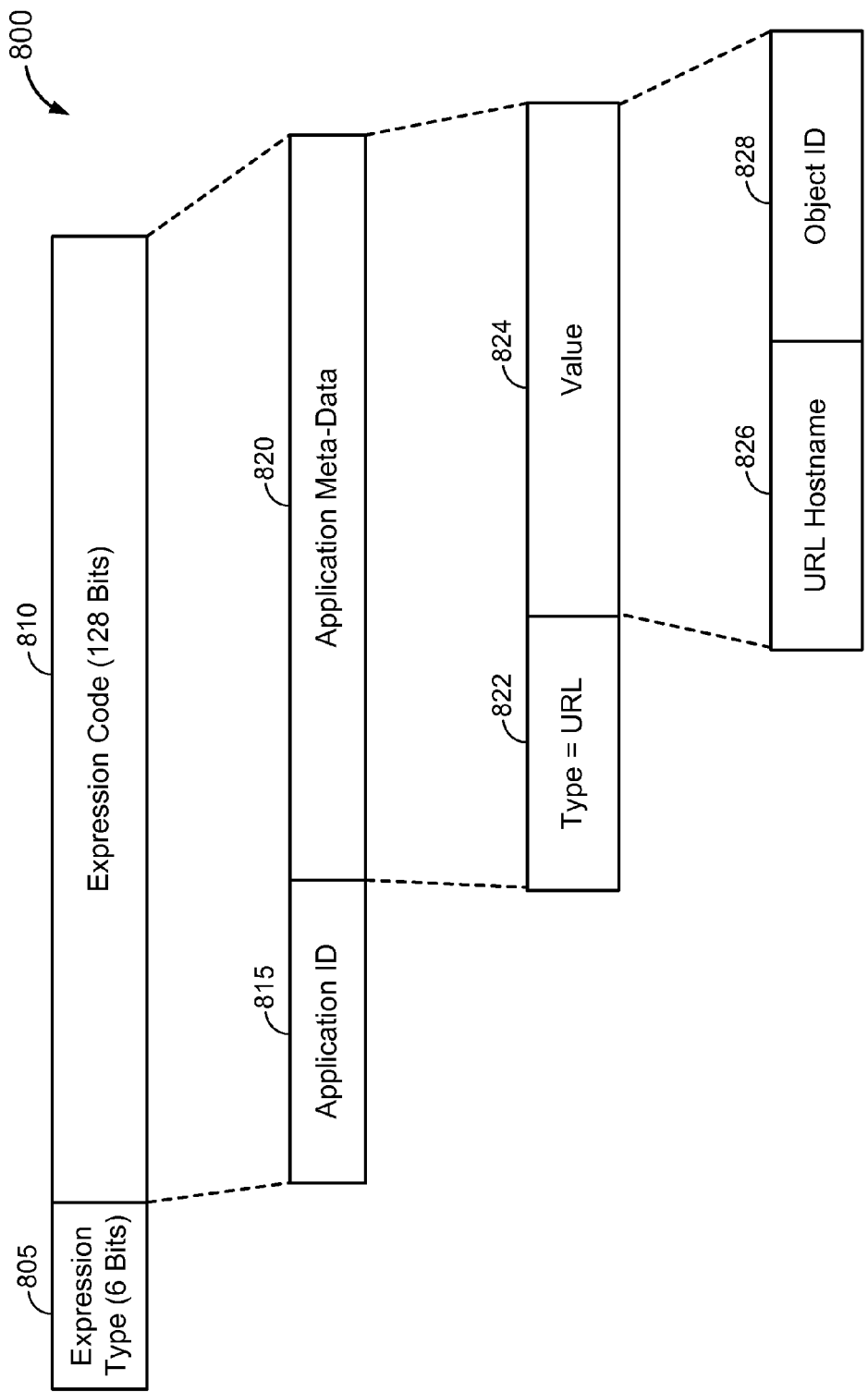
FIGS. 8A and B illustrate an exemplary use case where the LTE-D expression includes a uniform resource locator (URL).

FIGS. 8A and B illustrate an exemplary use case where the LTE-D expression includes a URL. FIG. 8A illustrates an exemplary LTE-D discovery message 800 according to an aspect of the disclosure. Referring to FIG. 8A, similar to the discovery message 600 in FIG. 6, the discovery message 800 includes a 6-bit Expression Type Field 805 and a 128-bit Expression Code Field 810. The 128-bit Expression Code Field 810 includes an Application Identifier field 815 for a particular LTE-D aware application and an Application Metadata field 820. The Application Metadata field 820 includes Type and Value fields 822 and 824. In the example of FIG. 8A, the Type field 822 is set to "URL." The Value field 824 includes a URL Hostname field 826 and an Object Identifier field 828.

Figure 8B:
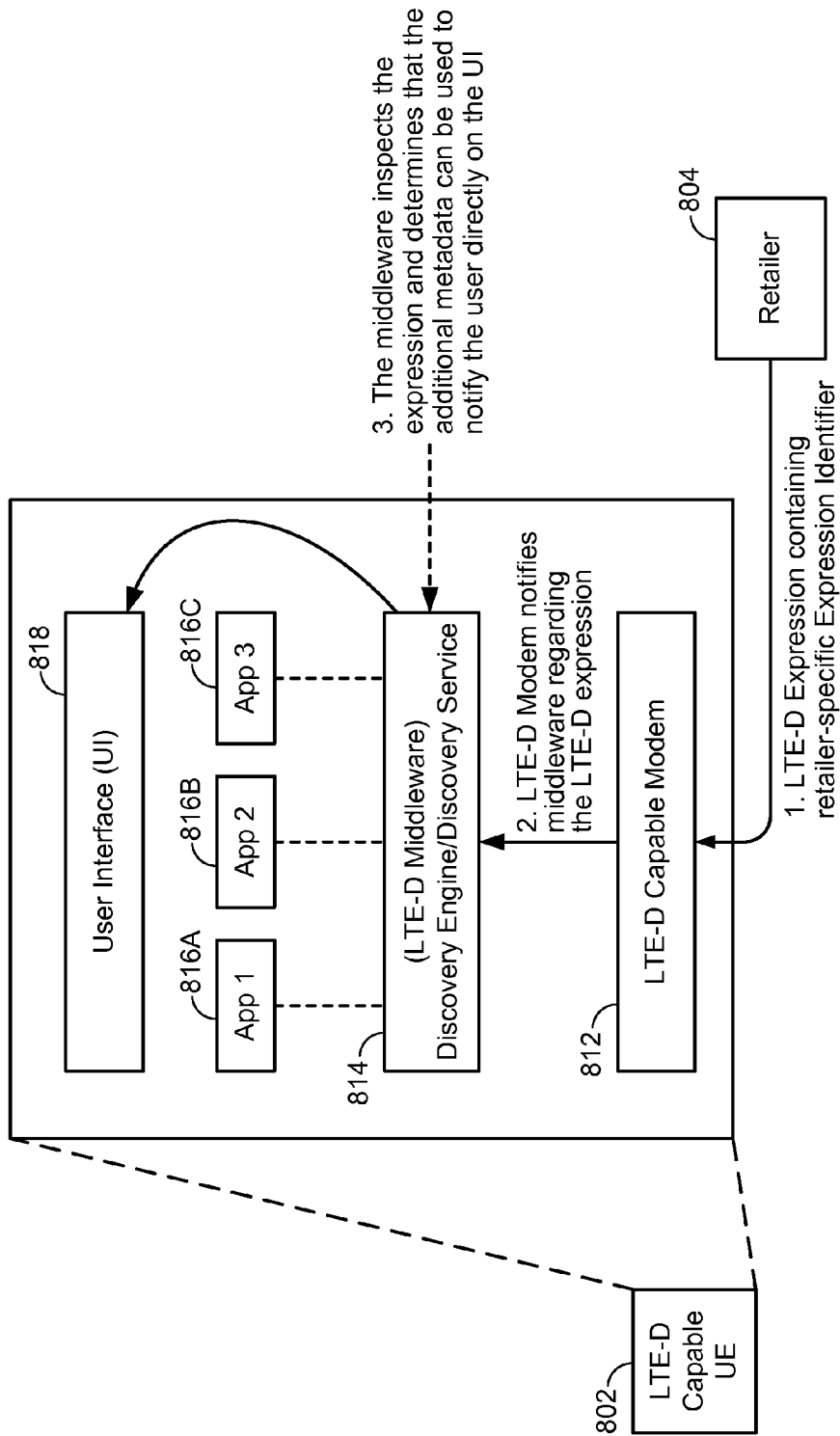

FIG. 8B illustrates an example of presenting the information in the LTE-D discovery message 800 according to an aspect of the disclosure. At step 1, an LTE-D capable UE 802, specifically the LTE-D capable modem 812, receives an LTE-D discovery message, such as LTE-D discovery message 800, containing a retailer-specific expression identifier from a retailer 804. At step 2, the LTE-D capable modem 812 notifies the LTE-D middleware 814 regarding the LTE-D expression in the LTE-D discovery message. At step 3, the LTE-D middleware 814 inspects the LTE-D expression and decides that the additional metadata can be used to notify the user without invoking the LTE-D aware application identified in the LTE-D discovery message.

Depending on the type of information in the LTE-D expression, the LTE-D middleware 814 may invoke a pre-installed HLOS application or display the information directly on the user interface (UI) of UE 802. In the example of FIG. 8B, the additional metadata includes a URL and a short message, and the LTE-D middleware 814 can render this information on the UI 818 in the form of a notification with a link permitting the user to launch (or download if not previously installed) the LTE-D application identified in the LTE-D discovery message or an HLOS application capable of rendering the content, such as the pre-installed web browser.

In the example of FIG. 8B, the UE 802 includes three LTE-D aware applications 816A-C. As is apparent, however, UE 802 could have more or fewer of such applications installed. Although UE 802 has these LTE-D aware applications installed, as described above, the LTE-D middleware 814 need not invoke one of these applications to render the content received in the LTE-D expression.

Figure 9:
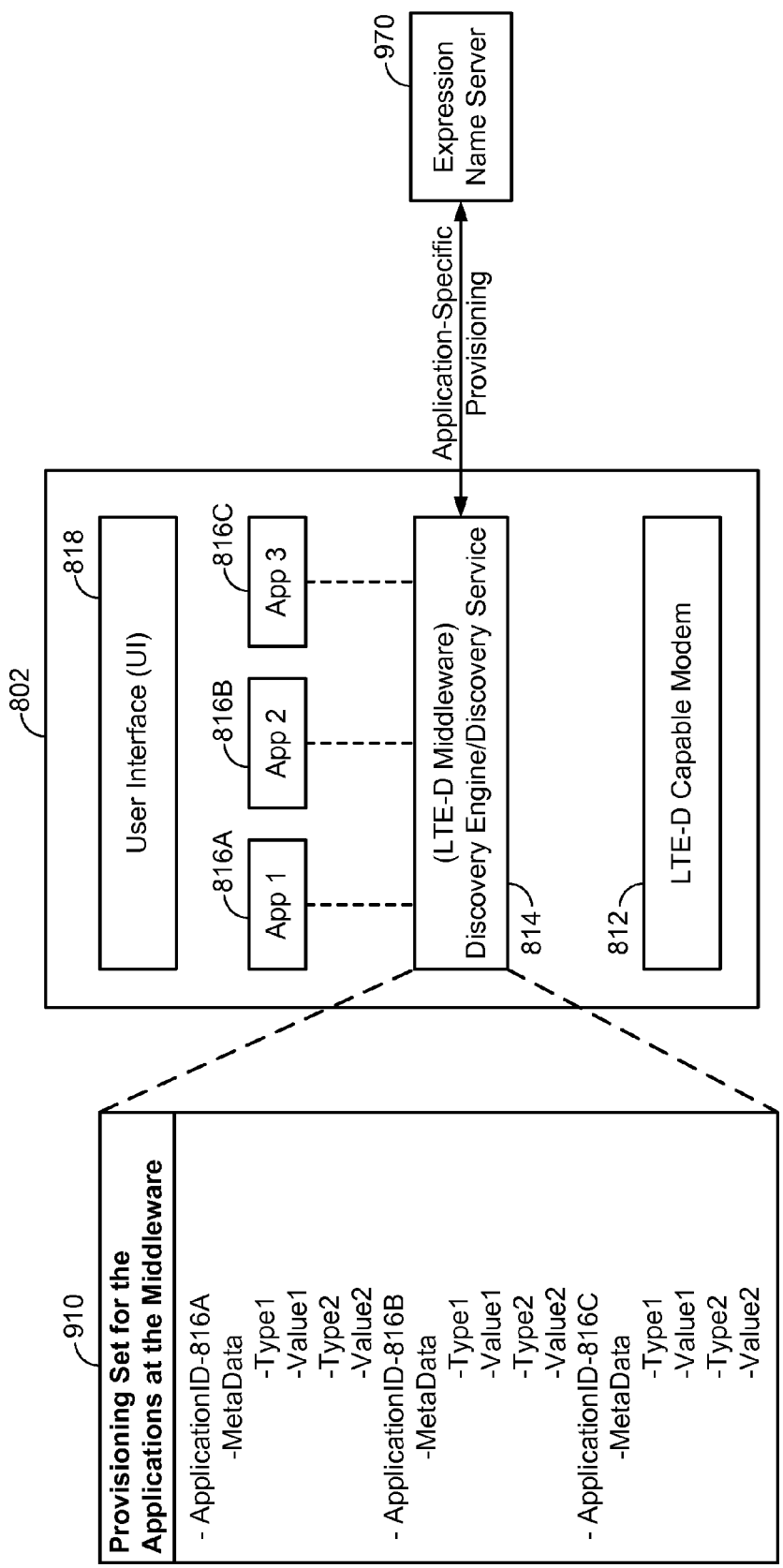
FIG. 9 illustrates an example of provisioning the LTE-D middleware with application-specific information.

To accomplish the functionality described above with reference to FIGS. 8A-B, the LTE-D middleware 814 needs to be provisioned with application identifiers and other application related metadata. FIG. 9 illustrates an example of provisioning the LTE-D middleware 814 with this application-specific information. As illustrated in FIG. 9, an expression name server 970 provisions the LTE-D middleware 814 with application-specific information 910. The expression name server 970 can perform the provisioning using standard Open Mobile Alliance Device Management (OMA DM) protocols. The expression name server 970 may perform the provisioning when, for example, the user downloads an application or upon user request. Alternatively, the application-specific information 910 can be provisioned on the UE 802 before the UE 802 is provided to the consumer, e.g., by the original equipment manufacturer (OEM). For example, the application-specific information 910 may be provisioned on the UE 802 when the OEM installs the HLOS applications on the UE 802. In the example of FIG. 9, the application-specific information 910 includes the application identifiers and metadata for LTE-D aware applications 816A-C. The metadata is represented as type-value pairs.

Although FIG. 9 illustrates the application-specific information 910 including information for only LTE-D aware applications 816A-C, the application-specific information 910 may include information for each LTE-D aware application installed on UE 802. It may also include information for each non-LTE-D aware application installed on UE 802. Similarly, although FIG. 9 only illustrates the metadata for each LTE-D aware application 916A-C including two type-value pairs, the metadata may include any number of type-value pairs.

There are other applications of the LTE-D middleware 814 being able to bypass the specific LTE-D application to which a received LTE-D expression is directed. For example, the LTE-D expressions directed to a specific LTE-D aware location application can be leveraged to provide continuous user tracking. Specifically, users/UEs can share their location via a web URL without invoking a location specific LTE-D aware application. Users/UEs can update each other with their locations via periodic LTE-D discovery messages. The LTE-D middleware 814 can invoke the local HLOS map application and feed the location information to that application continuously, instead of invoking the LTE-D aware application to which the LTE-D discovery message is directed.

Figure 10A:
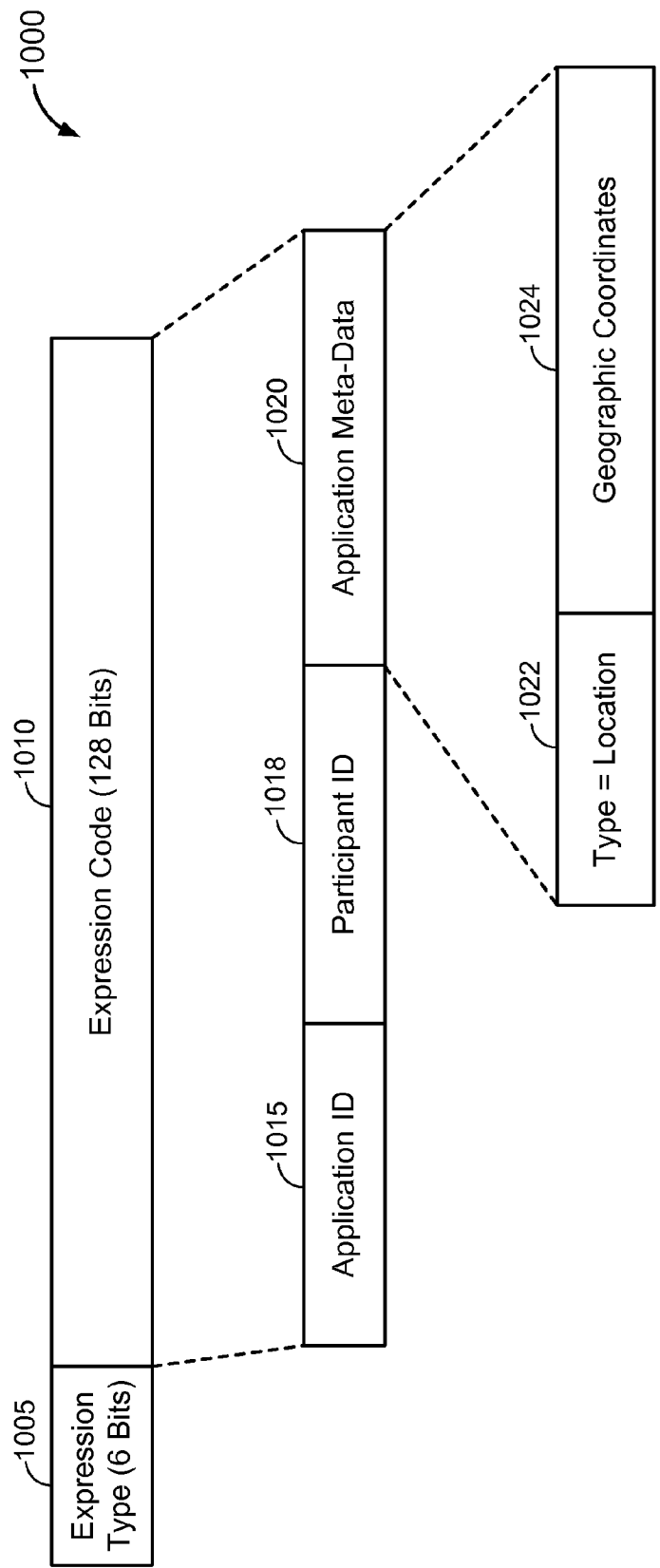
FIGS. 10A and B illustrate an exemplary use case where the LTE-D expression includes geographic coordinates of a user.

FIG. 10A illustrates an exemplary LTE-D discovery message 1000 according to an aspect of the disclosure. Referring to FIG. 10A, similar to the discovery message 800 in FIG. 8A, the discovery message 1000 includes a 6-bit Expression Type Field 1005 and a 128-bit Expression Code Field 1010. The 128-bit Expression Code Field 1010 includes an Application Identifier field 1015 for a particular LTE-D aware application, a Participant ID 1018, and an Application Metadata field 1020. The Application Metadata field 1020 includes Type and Value fields 1022 and 1024. In the example of FIG. 10A, the Type field 1022 is set to "Location" and the Value field 1024 includes the geographic coordinates of the user corresponding to the Participant ID 1018.

Figure 10B:
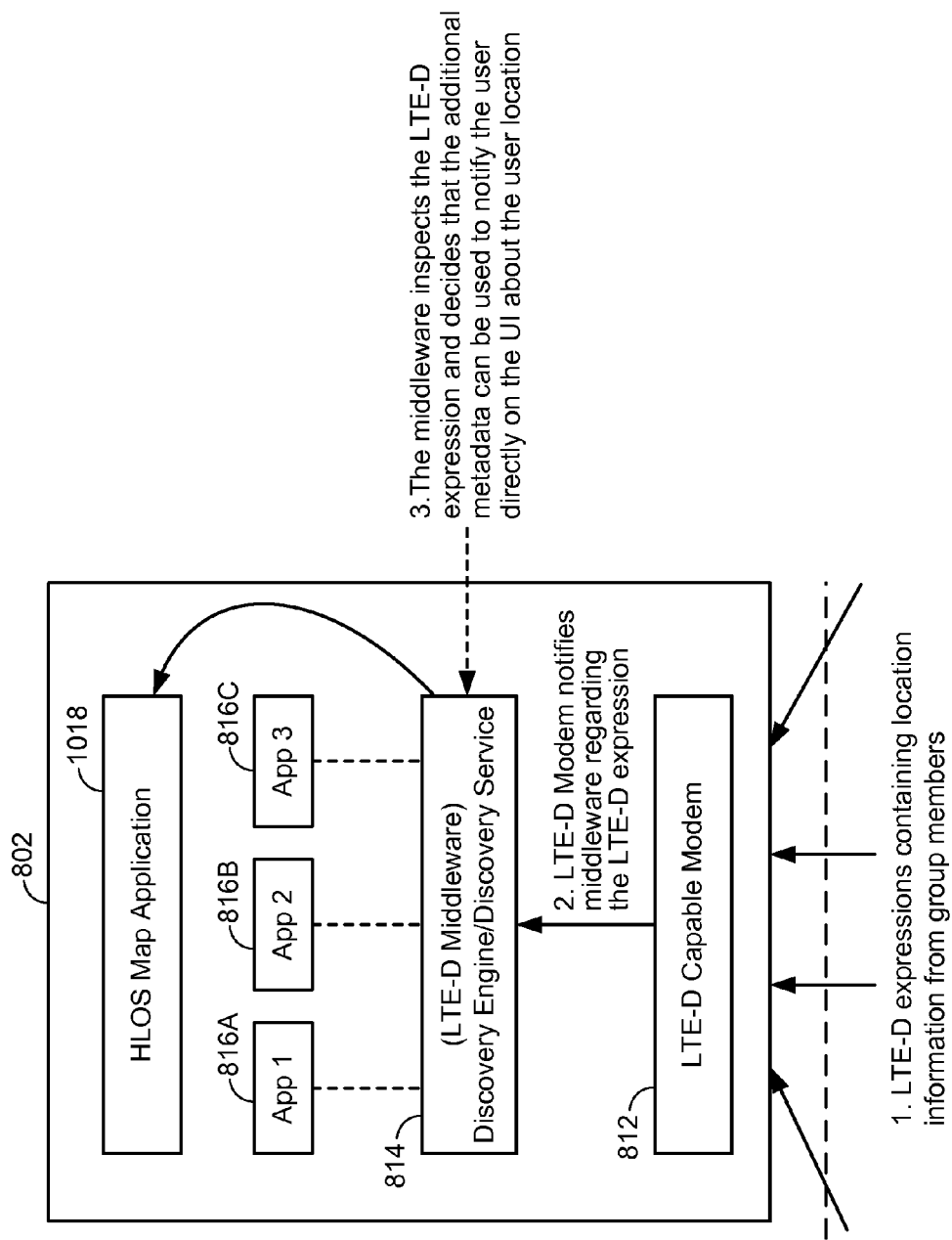

FIG. 10B illustrates an example of presenting the information in the LTE-D discovery message 1000 according to an aspect of the disclosure. At step 1, the LTE-D capable UE 802 in FIG. 8B, specifically the LTE-D capable modem 812, receives a plurality of LTE-D discovery messages, such as LTE-D discovery message 1000, containing location information of a corresponding plurality of users. The users may be members of a communications group, for example. At step 2, the LTE-D capable modem 812 notifies the LTE-D middleware 814 regarding the LTE-D expression 1010 in the LTE-D discovery message 1000. At step 3, the LTE-D middleware 814 inspects the LTE-D expression 1010 and decides that the additional metadata can be used to notify the user via an HLOS application instead of the LTE-D aware application identified in the LTE-D expression 1010. In the example of FIG. 10B, the additional metadata includes the participant location information illustrated in FIG. 10A, and the LTE-D middleware 814 can send this information directly to a HLOS map application 1018 instead of the specific LTE-D aware application identified in the LTE-D discovery message 1000. In this way, the LTE-D middleware 814 can continuously update the HLOS map application 1018 based on the periodic LTE-D expressions received from the group members.

Other applications of the LTE-D middleware 814 being able to bypass the specific LTE-D aware application to which an LTE-D expression is directed include both real-time and non-real-time cases. For example, users can share news or micro-blog feeds in real-time with each other via "tiny" URLs fed to the HLOS web browser by the LTE-D middleware 814. As another example, users can share real-time messages, videos, files, etc. Users can post the real-time or non-real-time media to a web URL and share the web URL with other users via LTE-D discovery messages.

Figure 11:
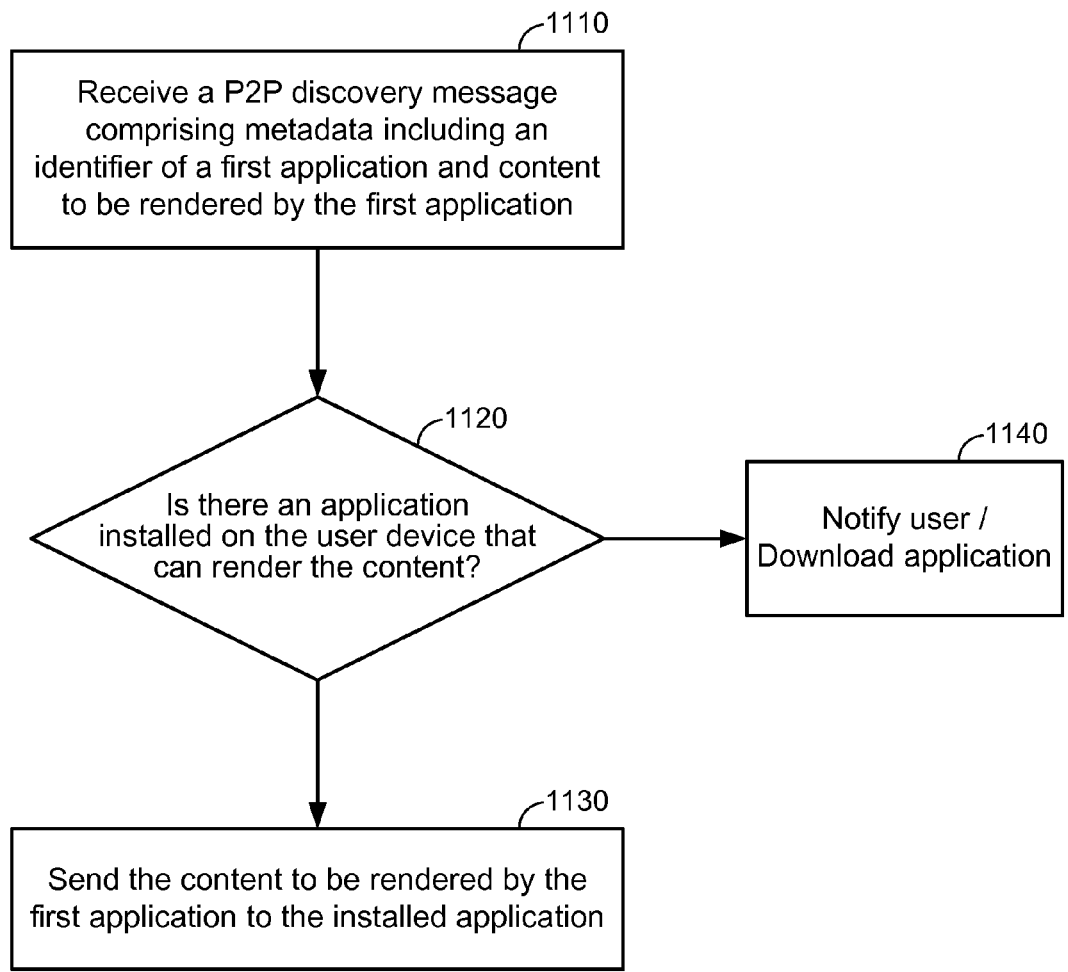
FIG. 11 illustrates an exemplary flow for leveraging P2P discovery messages for application layer contextual communication according to an aspect of the disclosure.

FIG. 11 illustrates an exemplary flow for leveraging P2P discovery messages for application layer contextual communication according to an aspect of the disclosure. The flow illustrated in FIG. 11 may be performed by a P2P middleware layer of a user device, such as the LTE-D middleware 814 in FIG. 8B. As discussed above with reference to FIG. 9, the P2P middleware layer may be provisioned with identifiers of applications installed on the user device and metadata related to the installed applications.

At 1110, the P2P middleware layer receives a P2P discovery message comprising metadata including an identifier of a first application and content to be rendered by the first application. The P2P discovery message may be an LTE-D discovery message, such as LTE-D discovery message 800 in FIG. 8A or 1000 in FIG. 10A. As discussed with reference to those figures, the LTE-D discovery message may include an LTE-D expression, and the LTE-D expression may include the metadata including the identifier of the first application and the content to be rendered by the first application.

At 1120, the P2P middleware layer determines whether or not there is an application installed on the user device that can render the content. Where the determining at 1120 comprises determining that the first application is installed on the user device, the installed application may be the first application. Where the determining at 1120 comprises determining that the first application is not installed on the user device, the installed application may be a different application than the first application.

In an aspect, the first application may be a P2P-enabled application, and the installed application may be a non-P2P-enabled application. The non-P2P-enabled application may be an Internet browser application, a mapping application, an image gallery application, a video player application, a user interface notification application, etc. In an aspect, the determination at 1120 may be based on a type of the content in the P2P discovery message to be rendered. For example, the P2P discovery message may include a location update from another user device and the installed application may be a non-P2P-enabled mapping application. As another example, the P2P discovery message may include a media message from another user device and the installed application may be a non-P2P-enabled Internet browser application. The media message may include a link to media content, and the Internet browser application may display the link.

At 1130, based on there being an application installed on the user device that can render the content, the P2P middleware layer sends the content to be rendered by the first application to the installed application. Although not illustrated in FIG. 11, the P2P middleware layer can invoke the installed application before sending the content to the installed application.

Otherwise, at 1140, based on there not being an application installed on the user device that can render the content, the P2P middleware layer can notify the user that there is no application installed on the user device that can render the content and give the user the option to download the application, or simply automatically download the necessary application without user interaction.

Figure 12:
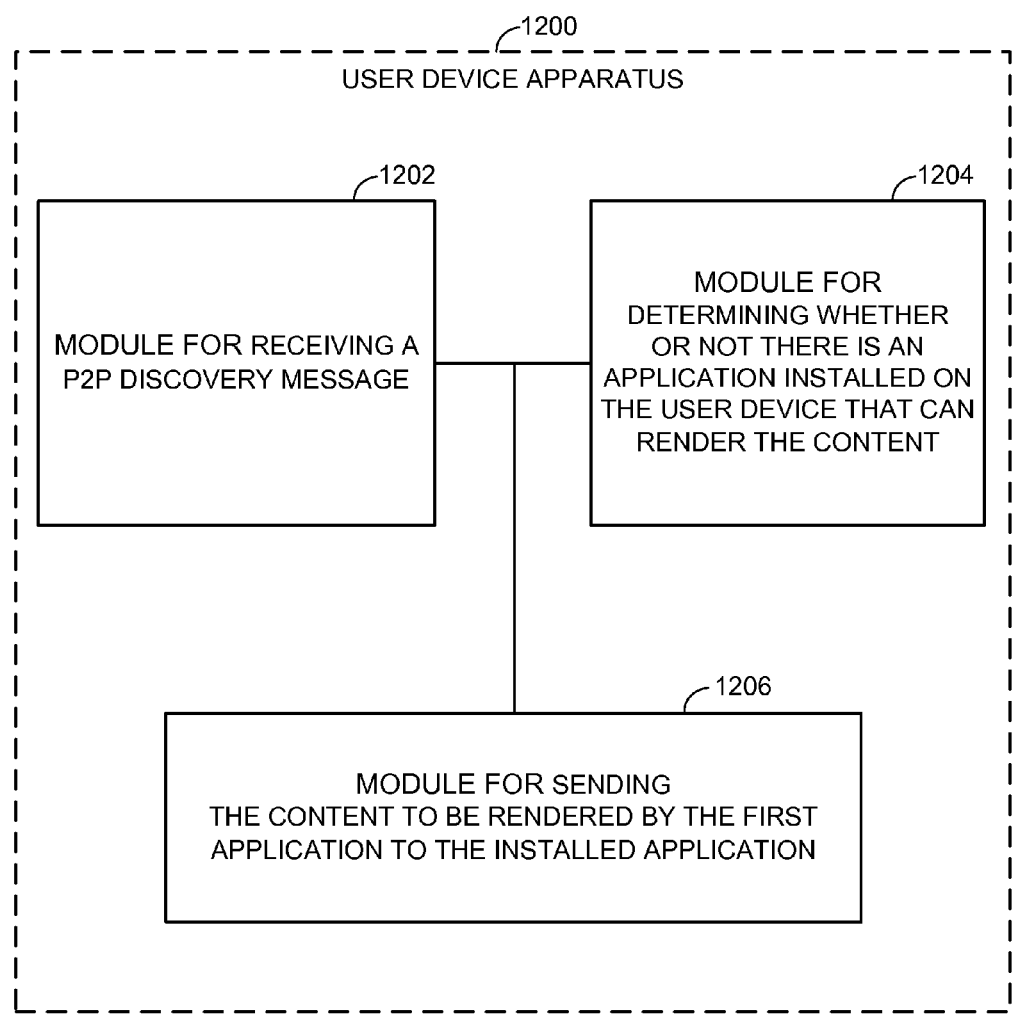
FIG. 12 is a simplified block diagram of several sample aspects of apparatuses configured to support communication as taught herein.

FIG. 12 illustrates an example user device apparatus 1200 represented as a series of interrelated functional modules. A module for receiving 1202 may correspond at least in some aspects to, for example, a processing system in conjunction with a P2P middleware layer as discussed herein. A module for determining 1204 may correspond at least in some aspects to, for example, a processing system in conjunction with a P2P middleware layer as discussed herein. A module for sending 1206 may correspond at least in some aspects to, for example, a processing system in conjunction with a P2P middleware layer as discussed herein.

The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method for leveraging peer-to-peer (P2P) discovery messages for application layer contextual communication, comprising:
   receiving, at a P2P middleware layer of a user device, a P2P discovery message, the P2P discovery message comprising metadata including an identifier of a first application and content to be rendered by the first application;
   determining, by the P2P middleware layer, whether or not there is an application installed on the user device, other than the first application, that can render the content; and
   based on there being the application installed on the user device that can render the content, sending, by the P2P middleware layer, the content to be rendered by the first application to the application installed on the user device.

2. The method of claim 1, further comprising:
   invoking, by the P2P middleware layer, the application installed on the user device before sending the content to the application installed on the user device.

3. The method of claim 1, further comprising determining that the first application is not installed on the user device.

4. The method of claim 1, wherein the first application comprises a P2P-enabled application, and wherein the application installed on the user device comprises a non-P2P-enabled application.

5. The method of claim 4, wherein the non-P2P-enabled application comprises an Internet browser application, a mapping application, an image gallery application, a video player application, or a user interface notification application.

6. The method of claim 1, wherein the P2P middleware layer is provisioned with identifiers of applications installed on the user device and metadata related to the installed applications.

7. The method of claim 1, wherein determining whether or not there is the application installed on the user device that can render the content is based on a type of the content in the P2P discovery message to be rendered.

8. The method of claim 1, wherein the P2P discovery message comprises a location update from another user device, and wherein the application installed on the user device comprises a non-P2P-enabled mapping application.

9. The method of claim 1, wherein the P2P discovery message comprises a media message from another user device, and wherein the application installed on the user device comprises a non-P2P-enabled Internet browser application.

10. The method of claim 9, wherein the media message comprises a link to media content, and wherein the Internet browser application displays the link.

11. The method of claim 1, wherein the P2P discovery message comprises a Long-Term Evolution Direct (LTE-D) discovery message.

12. The method of claim 11, wherein the LTE-D discovery message comprises an LTE-D expression, and wherein the LTE-D expression comprises the metadata including the identifier of the first application and the content to be rendered by the first application.

13. An apparatus for leveraging peer-to-peer (P2P) discovery messages for application layer contextual communication, comprising:
    a processor; and
    a P2P middleware layer of a user device configured to perform, in conjunction with the processor, operations comprising:
      receive a P2P discovery message, the P2P discovery message comprising metadata including an identifier of a first application and content to be rendered by the first application;
      determine whether or not there is an application installed on the user, other than the first application, device that can render the content; and
      send the content to be rendered by the first application to the application installed on the user device based on there being the application installed on the user device that can render the content.

14. The apparatus of claim 13, wherein the P2P middleware layer is configured to perform further operations comprising:
    invoke the application before the content is sent to the application installed on the user device.

15. The apparatus of claim 13, wherein the P2P middleware layer is further configured to determine that the first application is not installed on the user device.

16. The apparatus of claim 13, wherein the first application comprises a P2P-enabled application, and wherein the application installed on the user device comprises a non-P2P-enabled application.

17. The apparatus of claim 16, wherein the non-P2P-enabled application comprises an Internet browser application, a mapping application, an image gallery application, a video player application, or a user interface notification application.

18. The apparatus of claim 13, wherein the P2P middleware layer is provisioned with identifiers of applications installed on the user device and metadata related to the installed applications.

19. The apparatus of claim 13, wherein the determination of whether or not there is the application installed on the user device that can render the content is based on a type of the content in the P2P discovery message to be rendered.

20. The apparatus of claim 13, wherein the P2P discovery message comprises a location update from another user device, and wherein the application installed on the user device comprises a non-P2P-enabled mapping application.

21. The apparatus of claim 13, wherein the P2P discovery message comprises a media message from another user device, and wherein the application installed on the user device comprises a non-P2P-enabled Internet browser application.

22. The apparatus of claim 21, wherein the media message comprises a link to media content, and wherein the Internet browser application displays the link.

23. The apparatus of claim 13, wherein the P2P discovery message comprises a Long-Term Evolution Direct (LTE-D) discovery message.

24. The apparatus of claim 23, wherein the LTE-D discovery message comprises an LTE-D expression, and wherein the LTE-D expression comprises the metadata including the identifier of the first application and the content to be rendered by the first application.

25. An apparatus for leveraging peer-to-peer (P2P) discovery messages for application layer contextual communication, comprising:
P2P middleware means of a user device for:
receiving a P2P discovery message, the P2P discovery message comprising metadata including an identifier of a first application and content to be rendered by the first application;
determining whether or not there is an application installed on the user device other than the first application, that can render the content; and
sending the content to be rendered by the first application to the application installed on the user device based on there being the application installed on the user device that can render the content.

26. A non-transitory computer-readable medium for leveraging peer-to-peer (P2P) discovery messages for application layer contextual communication, comprising:
at least one instruction to cause a P2P middleware layer of a user device to receive a P2P discovery message, the P2P discovery message comprising metadata including an identifier of a first application and content to be rendered by the first application;
at least one instruction to cause the P2P middleware layer to determine whether or not there is an application installed on the user device, other than the first application, that can render the content; and
at least one instruction to cause the P2P middleware layer to send the content to be rendered by the first application to the application installed on the user device based on there being the application installed on the user device that can render the content.

27. A method for leveraging peer-to-peer (P2P) discovery messages for application layer contextual communication, comprising:
receiving, at a user device, a P2P discovery message, the P2P discovery message comprising metadata including an identifier of a first application and content to be rendered by the first application;
determining, by the user device, whether or not there is an application installed on the user device, other than the first application, that can render the content; and
based on there being the application installed on the user device that can render the content, sending, by the user device, the content to be rendered by the first application to the application installed on the user device.

* * * * *